United States Patent [19]

Turler

[11] 3,952,137

[45] Apr. 20, 1976

[54] METHOD FOR THE FABRICATION OF A BITUMINOUS ROOFING MATERIAL

[75] Inventor: Hans J. Türler, Zurich, Switzerland

[73] Assignee: Ernst Brändli, Winterthur, Switzerland

[22] Filed: Apr. 2, 1973

[21] Appl. No.: 346,994

[30] Foreign Application Priority Data
Apr. 4, 1972 Switzerland.................... 5565/72

[52] U.S. Cl............................ 428/489; 260/28.5 A; 260/28.5 B; 260/718
[51] Int. Cl.².................. C08L 91/00; C08L 95/00; B32B 11/00; D06N 5/00
[58] Field of Search ....... 117/168; 260/285, 28.5 A, 260/28.5 B, 718; 428/489

[56] References Cited
UNITED STATES PATENTS

| | | | |
|---|---|---|---|
| 3,096,196 | 7/1963 | Bettoli et al. ..................... | 117/168 |
| 3,257,336 | 6/1966 | Levy et al. ........................ | 117/168 |
| 3,296,165 | 1/1967 | Kemp................................. | 117/168 |
| 3,332,799 | 7/1967 | Parker et al. ..................... | 117/168 |
| 3,360,490 | 12/1967 | Szymanski et al. ............... | 117/168 |
| 3,397,082 | 8/1968 | Podlipnik et al.................. | 117/168 |
| 3,778,397 | 12/1973 | Gannon et al. ................... | 117/168 |

*Primary Examiner*—Michael R. Lusignan
*Attorney, Agent, or Firm*—Littlepage, Quaintance, Murphy & Dobyns

[57] ABSTRACT

A method for the fabrication of a mixture composed of a highly-viscous liquid phase and a thermoplastic and/or elastomeric material which is delivered to the liquid phase in the form of a comminuted solid phase and thereafter plasticized. Importantly, the plasticizing heat is primarily generated by friction internally of the mass. The apparatus for the performance of the method comprises a work container and a stirrer and/or comminution element arranged therein and driven at a high peripheral speed.

7 Claims, 2 Drawing Figures

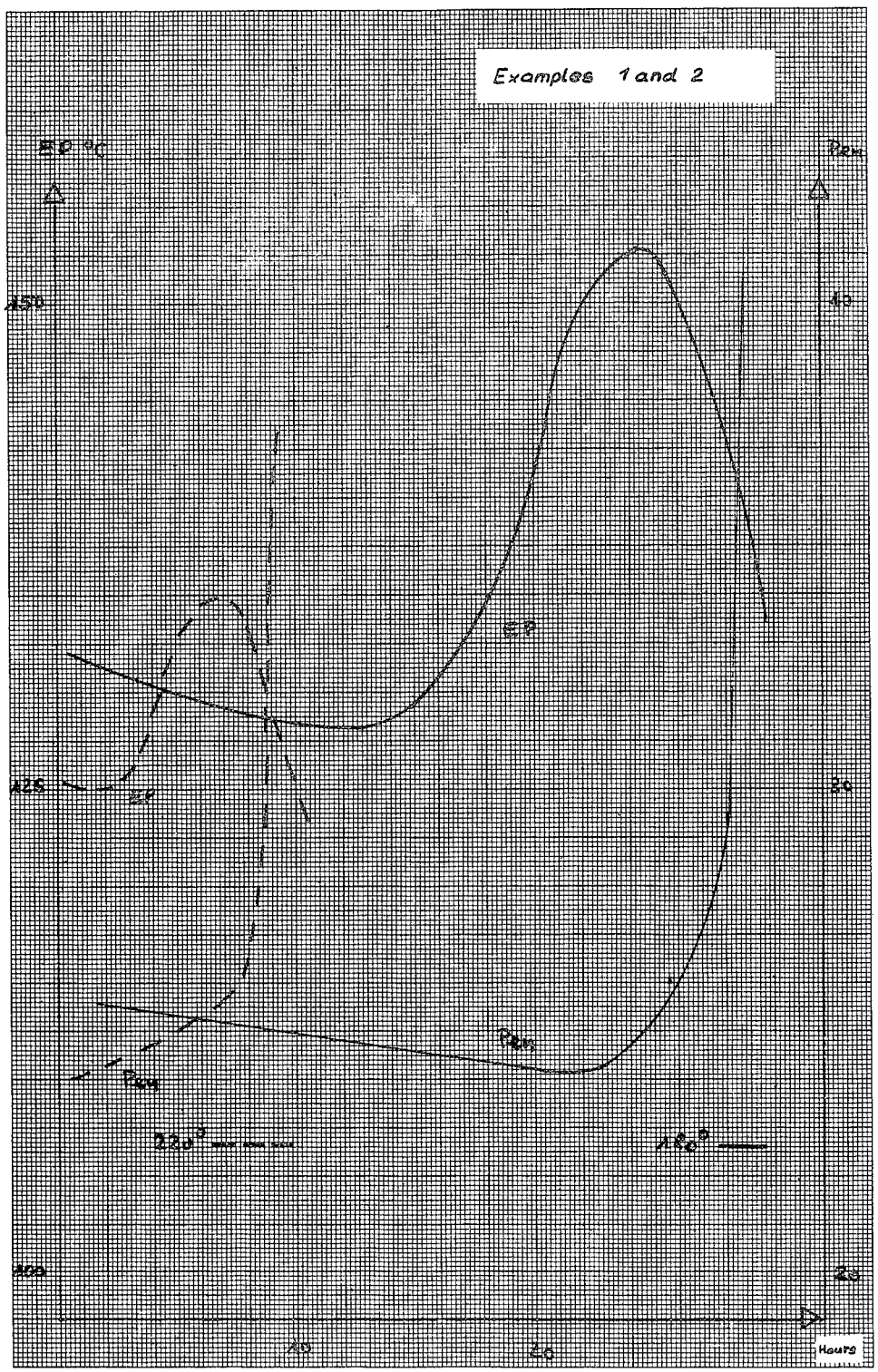

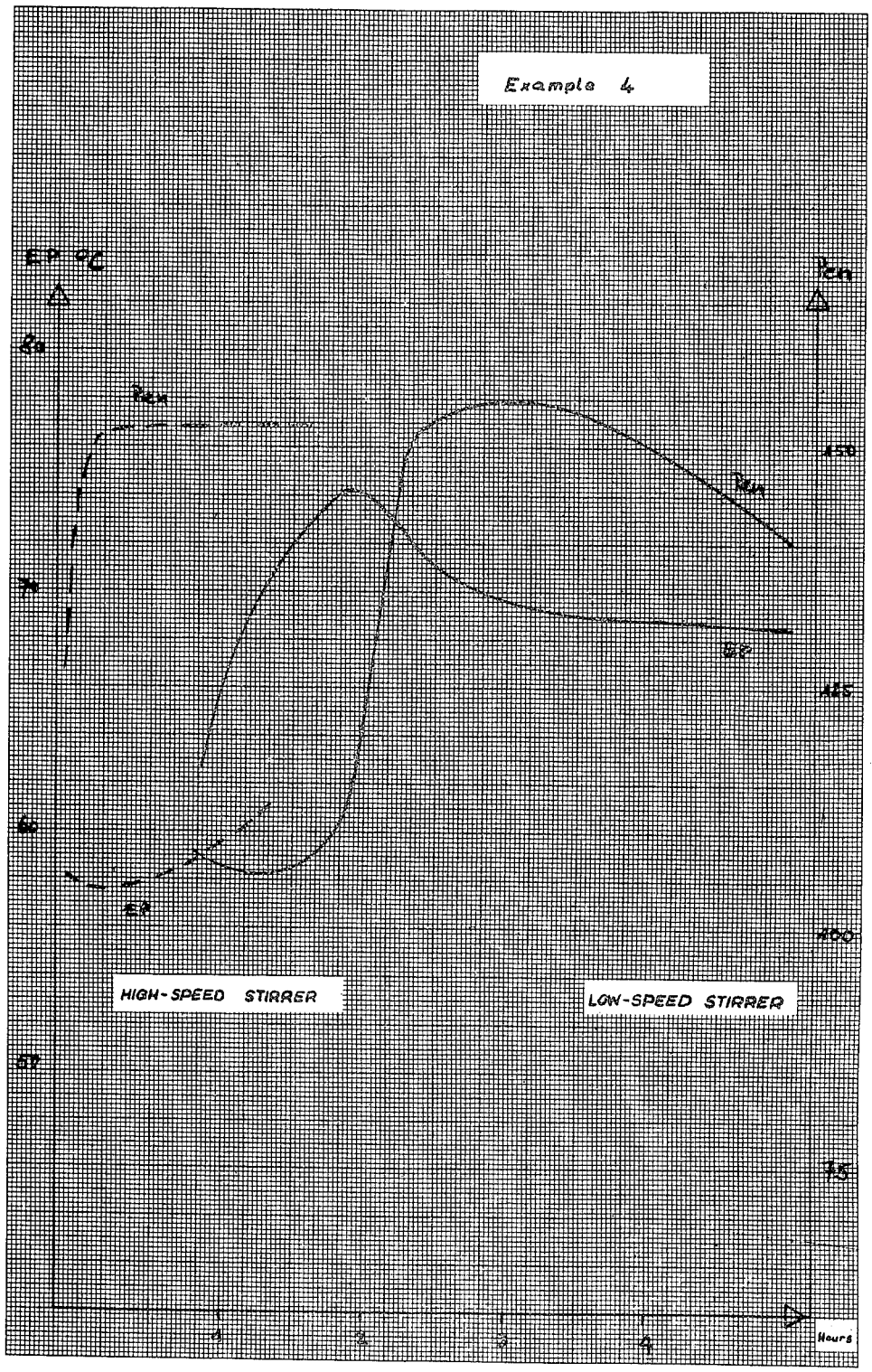

METHOD FOR THE FABRICATION OF A BITUMENOUS ROOFING MATERIAL

BACKGROUND OF THE INVENTION

The present invention relates to a new and improved method for the fabrication of a mixture from a highly-viscous liquid phase and a thermoplastic and/or elastomeric material, and further pertains to an apparatus for the performance of the aforesaid method and to the use of the method for the fabrication of mixtures of bitumen or tar and a thermoplastic or elastomeric material.

In many fields there is the requirement of fabricating a mixture of a highly-viscous liquid phase and a thermoplastic material. The procedures which are employed in such instances can influence, apart from the economies, also decisively the properties of the product. Under favorable circumstances such effects in practice can lead to failure in realizing the theoretically possible advancements. An example of this is the fabrication of sheets or webs for covering roofs and the use of a mixture of bitumen and a thermoplastic or elastomeric material. Such mixtures have become known in more recent times, and it has been found that, in contrast to bitumen (without the mentioned mixture components) especially when employed in conjunction with roofing pasteboards and the like, they possess outstanding properties. These properties particularly come into play during the laying of the roof and with respect to the quality and longevity of the roofing coating or covering, especially also, but not exclusively, in the fact that the inherent properties of the bitumen and which are disadvantageous in this environment of use, can be overcome. Up to the present there was not available any technique which enabled fabricating the required quantities of such mixtures in a relatively short period of time as needed for the application thereof to the carrier web, without there either being present an impermissible expenditure in equipment and/or impairment of the material properties.

Mixtures of the previously mentioned type were heretofore fabricated, for instance, in extruders, calenders, kneaders, Banbury-mixers and the like. Starting with solid or solid and liquid phases, the material was mechanically processed in such equipment in narrow gaps, with the result that localized plasticizing and mixing occurred. As a result, there could occur mechanical decomposition of the plastic and synthetic rubber, but also undesired depolymerization because of localized overheating. Furthermore, the output, in relation to the considerable expenditure in equipment, is relatively small, especially when it is considered that the mixture is supplied to a high-speed roofing pasteboard or coating installation.

Mixtures of the type under consideration also can be fabricated in slowly operating stirrers wherein, for instance, a liquid phase is admixed with a solid phase or a different liquid phase and brought into a state of solution. As a result, it is possible to process large charges or batches, but still the mixing operation must be carried out over a considerably long time-span at high temperatures, so that for instance plastic constituents are subjected to thermal decomposition, with the result that the exceptional properties attributable to such mixture components like plasticity, elasticity, aging resistance and the like, are destroyed. Since such mixtures are further processed at elevated temperatures and the thermal decomposition, depending upon the composition of the materials, already can occur after a relatively short period of time, the long fabrication times requires particular speed during the further processing, for instance during casting or application to the carrier webs, since otherwise the impairment in the properties during use can be promoted or can occur in any case. Hence, for supplying high-speed operating roofing pasteboard installations and the like, these proposals have been found to be unsuitable.

SUMMARY OF THE INVENTION

Hence, it is a primary object of the present invention to provide a method for the fabrication of a mixture composed of a highly viscous liquid phase and a thermoplastic and/or elastomeric material as well as apparatus for the performance of the aforesaid method and the use of this method for the fabrication of mixtures of bitumen or tar and a thermoplastic or elastomeric material, which is not associated with the aforementioned drawbacks and limitations of the prior art proposals.

Now it has been surprisingly found that a mixture of bitumen or tar and a thermoplastic or elastomeric material, with the presence of the first-mentioned component (bitumen or tar) in a liquid phase and the last-mentioned component (thermoplastic and/or elastomeric material) in a solid phase, can be fabricated in a so-called rapid stirrer in large batches and during a short mixing time, and while preventing damaging mechanical or thermal effects. This success could not be predicted, and it is also not obvious, particularly if one considers that the thermoplastic or elastomeric material added in the form of a solid phase to the bitumen must transform, during plasticizing, into the liquid phase, in other words there is required the performance of an operation for which the prerequisites for a high-speed stirrer or mixer are not provided. Firstly, there is absent the narrow gap in which the relevant components — as such, for instance, is the case for extruders and mixing rollers — can be plasticized by friction between two surfaces moving relative to one another. On the other hand, there is not required any external infeed of heat for a longer period of time, in order to realize the plasticizing or dissolution effects. The explanation for the success which is nonetheless realized might be in terms of the fact that the rapidly-rotating stirrer member, for instance a toothed disk, generates at the liquid phase, continuously and at localized regions, the required plasticizing heat and, furthermore, the solid particles, which are uninterruptedly transported past the stirrer element are comminuted and their swelled, already dissolved surface layers, are peeled away. Hence, there are always again presented to the stirrer element new or exposed solid particles and therefore delivered so-to-speak to a plasticizing location, wherein already plasticized constituents can be directly drawn into the mixing operation. Of course, the mixed material is also heated so that at the end of the (brief) mixing operation it can be delivered for further processing. The infeed of heat from the outside, with this procedure, is only of secondary significance, particularly since the temperature of the mixed material is a function of the therein generated heat. It is below the decomposition temperature. In consideration thereof, and because the components are subjected, in each case only briefly to the intensive thermal action at the region of the stirrer element during its rotation within the mass, there does not occur any thermal or mechanical molecular decomposition, although, and however especially for the reason that the plasticizing and dispersion of the thermal-sensitive components in the bitumen proceeds very intensely and rapidly.

BRIEF DESCRIPTION OF THE DRAWINGS

The first drawing represents a comparison between the prior art practice of Example 1 and the practice of this invention in Example 2.

The second drawing makes a like comparison with Example 4.

DETAILED DESCRIPTION OF THE INVENTION

Starting from what has been discussed above, the inventive method, in its broadest aspects, can be recognized from the features that during fabrication of a mixture of a highly-viscous liquid phase and a thermoplastic and/or elastomeric material which is delivered to the liquid phase in the form of a comminuted solid phase and thereafter plasticized, the heat required for plasticizing is primarily generated by friction internally of the mass.

This can be achieved with the aid of an apparatus which, according to the invention, comprises a work container or vessel which, if desired, can be heated, and a stirrer and/or comminution element arranged in the work container and which element can be driven at increased peripheral speed, in particular in the order of 20 to 40 meters per second. There can be produced according to the teachings of the invention and with the aid of the aforementioned apparatus, mixtures composed of bitumen and tar and a thermoplastic or elastomeric material, especially for the impregnation and/or coating of roofing covering material, such as roofing pasteboard and the like, with the assistance of a coating or roofing pasteboard installation.

With respect to the last-mentioned field of use, there can be particularly realized the result that with the aid of high-speed stirrers or mixers it is possible to form, in a very short period of time and in considerable quantities, mixtures composed of liquid bitumen and, for instance, a thermoplastic material in the form of a solid phase, and specifically in such quantities which are adequate for the continuous supply of a roofing pasteboard installation or the like. Thus, such installation can be equipped for instance with two high-speed mixers and while making complete use of its capacity can be maintained in continuous operation, and wherein the possible improvement in quality can be fully made use of.

At this point it is mentioned that there is particularly preferred as the bitumen a primary bitumen, that is, the distilled type bitumen, but an oxidized bitumen also can be employed. As the thermoplastic material there is particularly preferred a thermoplastic synthetic rubber. Other possible examples of thermoplastic materials are polypropylene and polyethylene. As the elastomeric material there can be used natural rubber, reclaimed rubber, polychloroprene. Fillers which can be used in the practice of the invention are slate dust, asbestos fibers, limestone and ground tire treads, by way of example.

In order to further elucidate the teachings of the invention, there will hereinafter be given a number of examples which relate both to the prior art mixing operations and examples of the invention and by virtue of the comparative examples the attained surprising results will be better understood. The percents given hereinafter refer to percent by weight.

EXAMPLE 1 (Prior art method)

In a stirrer with an oil circulation heating system and operating at 15 rpm, there is fabricated a charge of 8,000 liters of the following composition:

| | |
|---|---|
| Primary bitumen | 45% |
| Thermoplastic synthetic rubber | 20% |
| Slate dust | 35% |

The bitumen is at a temperature of 220°C, and the thermoplastic material is infed within 10 minutes, producing a mixture temperature of 160°C. Heating-up to the solution temperature of about 200°C requires 4 hours. For complete dissolving there is necessary an additional 4 hours. After 8 hours the mineral filler is added and the mass cooled to 165°C. The viscosity increased from $10^4$ cps to $6 \times 10^4$ cps. The mass is now then heated until attaining a viscosity of $2 \times 10^4$, so that it can be subjected to the further processing or working operation. The infeed and admixing of the fillers and the reheating of the mass lasts for about 4 hours, so that a total fabrication time of 12 hours is necessary.

EXAMPLE 2 (Inventive method)

In an oil-heated vessel of 2,500 liters capacity, there should be produced the same mixture as in Example 1, but this time with the aid of a high-speed mixer with high-shearing action. The mixer operates at a peripheral speed of about 25 meters per second. The primary bitumen is at a temperature of 220°C and with the mixer operating the thermoplastic material i.e. thermoplastic synthetic rubber is uniformly dosed or infed by means of a conveyor band, a worm or by blowing-in with air, within 10 minutes. The temperature thus only drops to 190°C and through the developed frictional heat and the external heating again reaches 220°C within 10 minutes. Within this time there already occurs a complete dissolving and dispersion of the thermoplastic material.

Now within a further 10 minutes the filler i.e. slate dust is infed as above explained and simultaneously dispersed. For uniform mixing or homogenization thereof and for adjustment of the temperature, there are necessary at most a further 5 minutes. Consequently, the mixing time amounts to 30–35 minutes. When using two vessels with such a high-speed stirrer, there can be fabricated per hour 4000 to 5000 liters and in comparison to Example 1 this technique is 6.5 to 7.5 times faster.

From the accompanying graphs pertaining to Examples 1 and 2 it can be seen that the aforementioned mass at the critical temperature range (180°C – 220°C) already is subjected to thermal decomposition within a number of hours, in that the penetration (Pen) markedly increases and the softening point (EP) simultaneously markedly drops. At 180°C this occurs after about 22 hours, at 220°C already after about 6 hours. At the end of the mixing time (12 hours at 220°C) according to Example 1, one is thus already operating at the critical region, whereas with the short mixing time of Example 2 (less than 1 hour at 220°C) there is absolutely no damaging effect present and at the same time such procedure allows for a sufficient buffer time for intermediate storage at elevated temperatures until use.

EXAMPLE 3 a. A casting or pouring mass, consisting of:
70% oxidized bitumen
15% slate dust
15% ground rubber treads,
should be produced in a slowly rotating stirrer at 200°C. There are thus produced the following course of the softening point (EP) and penetration (Pen):

|  | EP | Pen. |
| --- | --- | --- |
| 15' | 92 | 38 |
| 30' | 98 | 37 |
| 1 h | 105 | 48 |
| 2 h | 102 | 42 |
| 4 h | 100 | 40 |

There can be noticed a clear increase in the softening point and penetration after the dissolving process, that is, between 30 minutes and 1 hour. This maximum value is however soon exceeded and the softening point and penetration already decrease after 1–2 hours owing to the decomposition of the rubber. If during the subsequent use of this mass heating is increased, for instance up to 250°C, then it experiences a considerably more rapid change, as will be recognized from the following table:

|  | EP | Pen. |
| --- | --- | --- |
| 30' | 94 | 47 |
| 1 h | 90 | 43 |
| 2 h | 84 | 45 |
| 4 h | 76 | 45 |

Hence in this case one is at the critical range and the mass, following its application, no longer possesses its original properties.

b. If however the mass is produced in a high-speed stirrer as previously explained, then it is already uniformly mixed after 15 minutes, so that there is available for its subsequent use a considerably longer time-span.

EXAMPLE 4

A casting or pouring mass, consisting of:
88% oxidized bitumen
6% vulcanized rubber powder and
6% virgin rubber powder,
should be produced in a slowly operating stirrer and a high-speed stirrer. From the accompanying graphs relating to Example 4 it will be seen that in the case of the slowly operating stirrer the softening point (EP) and the penetration (Pen) have reached optimum values after 2 hours and that then there occurs a rapid change which manifests itself through a decrease in the softening point and penetration. In the case of the high-speed stirrer the optimum values are already obtained after 15 minutes, so that a considerably greater amount of time is available for the use of the mass.

While there is shown and described present preferred embodiments of the invention, it is to be distinctly understood that the invention is not ilmited thereto, but may be otherwise variously embodied and practiced within the scope of the following claims.

What is claimed is:

1. In a process of fabricating a covering for roofs from (a) a bituminous material such as bitumen or a tar, (b) a solid polymeric material such as a flexible thermoplastic or elastomeric material and (c) a carrier for said materials, the improvement comprising the steps:
   1. providing said bituminous material in a highly viscous phase,
   2. providing said polymeric material in a comminuted solid phase,
   3. providing a high-speed mixer apparatus having a rapidly-rotating stirrer member,
   4. mixing said polymeric material into said bituminous material in said apparatus with a high shearing mixing action supplied by said rapidly-rotating stirrer member operated at a speed sufficient to supply most of the heat necessary to plasticize and dissolve (2) and continuing said mixing until a liquid mixture is obtained; and
   5. applying the liquid mixture to said carrier.

2. The process of claim 1 in which said stirrer member is operated at a peripheral speed in the order of 20 to 40 meters per second.

3. The process of claim 1 wherein the polymeric material is an elastomer.

4. The process of claim 1 wherein the carrier is impregnated.

5. The process of claim 1 wherein the carrier is coated.

6. The process of claim 3 in which the temperature at which the mixing takes place is between about 180° and 220°C.

7. An improved covering for a roof comprising a carrier having applied thereto a liquid mixture obtained from (a) a bituminous material such as a bitumen or a tar and (b) a solid polymeric material such as a flexible thermplastic or an elatomeric material obtained by:
   1. providing the bituminous material in the highly viscous phase,
   2. providing said polymeric material in a comminuted solid phase,
   3. providing a high-speed mixer apparatus having a rapidly-rotating stirrer member,
   4. mixing said polymeric material into said bituminous material in said apparatus with a high shearing mixing action supplied by said rapidly-rotating stirrer member operated at a speed sufficient to supply most of the heat necessary to plasticize the comminuted material and continuing said mixing until a liquid mixture is obtained; and
   5. applying the liquid mixture to said carrier.

\* \* \* \* \*